United States Patent [19]

Van Rijn et al.

[11] Patent Number: 4,565,230
[45] Date of Patent: Jan. 21, 1986

[54] MOVABLE CURTAIN SYSTEMS FOR GREENHOUSES AND COMPONENTS THEREFOR

[76] Inventors: Barend C. Van Rijn, 116 Pottruff Rd. South, Hamilton, Ontario, Canada, L8K 4A2; Cordell G. Van Rijn, 745 Hwy. No. 8, Fruitland, Ontario, Canada, L0R 1L0

[21] Appl. No.: 538,308

[22] Filed: Oct. 3, 1983

[51] Int. Cl.$^4$ ............................ A01G 9/14; E06B 3/30
[52] U.S. Cl. ........................................ 160/84 R; 47/17
[58] Field of Search ........................ 160/84 R, 236, 5; 47/17, 28, 8; 49/485, 495, 484

[56] References Cited

U.S. PATENT DOCUMENTS

| | | | |
|---|---|---|---|
| 300,063 | 6/1884 | Geertz | 160/84 R |
| 2,031,157 | 2/1936 | Gilson | 160/120 |
| 3,481,073 | 12/1969 | Yoshida et al. | 47/28 |
| 3,540,154 | 11/1970 | Claudio | 160/236 X |
| 3,761,347 | 9/1973 | Yackiw | 49/484 |

FOREIGN PATENT DOCUMENTS 2352939 12/1977 France ................... 49/484

Primary Examiner—Ramon S. Britts
Assistant Examiner—Cherney S. Lieberman
Attorney, Agent, or Firm—Hirons, Rogers & Scott

[57] ABSTRACT

A sealing member for the straight moving leading edge of a curtain system, such as is used for example in greenhouses to control the heating and/or lighting conditions, consists of an extruded L-section body with at least one flexible sealing element protruding from a first leg and a second flexible element protruding from the second leg when more complete sealing is required. Preferably the sealing element of the second leg protrudes perpendicularly, while that of the first leg protrudes at an angle away from the second leg. The two sealing elements extend the full length of the body and the curtain edge first engages the first element and bends it toward the first leg and then engages the second element, if present, and also bends it towards the first leg so as to form a sealing space between them. Both elements are held positively in sealing contact with the curtain leading edge by the resilience of the material of the elements. Both sealing elements are retained in respective narrow mouthed slots by enlarged beads on the edges engaged in the slots. Longitudinal edges of the body are rounded and can serve as terminations for the stationary edges of the curtains which can simply by clipped thereto by metal clips. The member also serves to support wires on which the curtains move and replaces separate support wires and brackets used hitherto for such installations.

14 Claims, 6 Drawing Figures

MOVABLE CURTAIN SYSTEMS FOR GREENHOUSES AND COMPONENTS THEREFOR

FIELD OF THE INVENTION

This invention is concerned with improvements in or relating to movable curtain systems used in greenhouses for control of heat loss and light, and with components therefor.

REVIEW OF THE PRIOR ART

Movable curtain systems are now extensively used for the control and reduction of heat loss through windows and, particularly in the case of greenhouses, also for the control of light transmission through the windows. For example, in the specific case of greenhouses, curtains of a predetermined shade value are provided and are drawn at least across the roof windows when it is judged that the incident sunlight is too strong; such curtains are made completely opaque when they are used to subject the growing crop to a predetermined regime of light and dark. With increasing energy costs greenhouse operators have also become much more interested in the possibility of energy saving, by providing the greenhouse with a set of curtains that are drawn at night to assist in insulating the greenhouse interior against the reduced outside night temperature. It is found surprisingly that it is extremely important to ensure that there are no substantial air leaks at the edges of the curtain system when drawn across the windows, since even a relatively small leak space will act as a chimney that quickly transfers the cool air trapped between the curtain and the windows to the warmer interior with consequent heat loss.

The problem of providing adequate sealing is particularly difficult with greenhouse curtain systems, owing to the wide variety of types and sizes of greenhouses that are manufactured, so that each system must be "custom built" for the particular greenhouse in which it is installed, making it correspondingly difficult to provide standard components adaptable easily to a wide range of such curtain systems.

DEFINITION OF THE INVENTION

It is therefore an object of the invention to provide a movable curtain system having effective air sealing means for the movable edge of the curtain.

It is also an object to provide a new sealing component for a movable curtain system for sealing the movable edge against passage of air when the curtain is closed.

It is a specific object to provide such a new sealing component that is adaptable to a wide range of curtain systems adaptable for use with a correspondingly wide range of greenhouse constructions.

In accordance with the present invention there is provided a self supporting sealing member for a movable curtain system greenhouses of the kind in which a curtain having a straight leading edge is opened and closed by longitudinal movement of the said straight leading edge transverse to its length, the curtain leading edge in the closed position of the curtain engaging the said sealing member, the sealing member comprising:

an elongated metal body of at least approximately L-shaped transverse cross-section having a first leg which in operation extends transverse to the direction of movement of the curtain, and having a second leg which in operation extends generally parallel to the direction of movement of the curtain; and a first elongated flexible seal element extending lengthwise of the sealing member and protruding from the second leg spaced from the first leg whereby upon engagement by the curtain leading edge it is deflected by the engagement towards the first leg so as to be held in sealing engagement with the curtain leading edge by the resilience of the material of the seal element.

Such a member has the first leg extending beyond its junction with the second leg to provide a bead over which the adjacent fixed edge of a curtain can be folded and secured thereto.

Such a member alternatively or in addition has formed in the two legs respective longitudinally-extending slots, each with a mouth narrower than the width of the slot, and each disposed at a location spaced from the free edge of the respective leg and the junction between the two legs.

The member may comprise a second elongated flexible seal element also extending lengthwise of the sealing member and protruding from the first leg at a location spaced from the second leg free edge and from the junction with the second leg whereby upon engagement of the curtain leading edge with the first seal element and deflection of the latter towards the first leg the curtain leading edge engages the second seal element for deflection thereof toward the first leg so that the second seal element also is held in sealing engagement with the curtain leading edge by the resilience of its material, the distance between the junction of the two legs and the junction of the second seal element with the first leg is less than the length of the first seal element, and the second seal element protrudes at an obtuse angle on the side nearer the second leg so that the distance between it and the second leg increases progressively away from its junction with the first leg.

DESCRIPTION OF THE DRAWINGS

A movable curtain system and sealing component therefor that are particular preferred embodiments of the present invention will now be described, by way of example, with reference to the accompanying diagrammatic drawings, wherein:

FIG. 6 is a perspective view from above showing a construction for sealing the side edges of the movable curtain.

DESCRIPTION OF THE PREFERRED EMBODIMENTS

Figure 1:
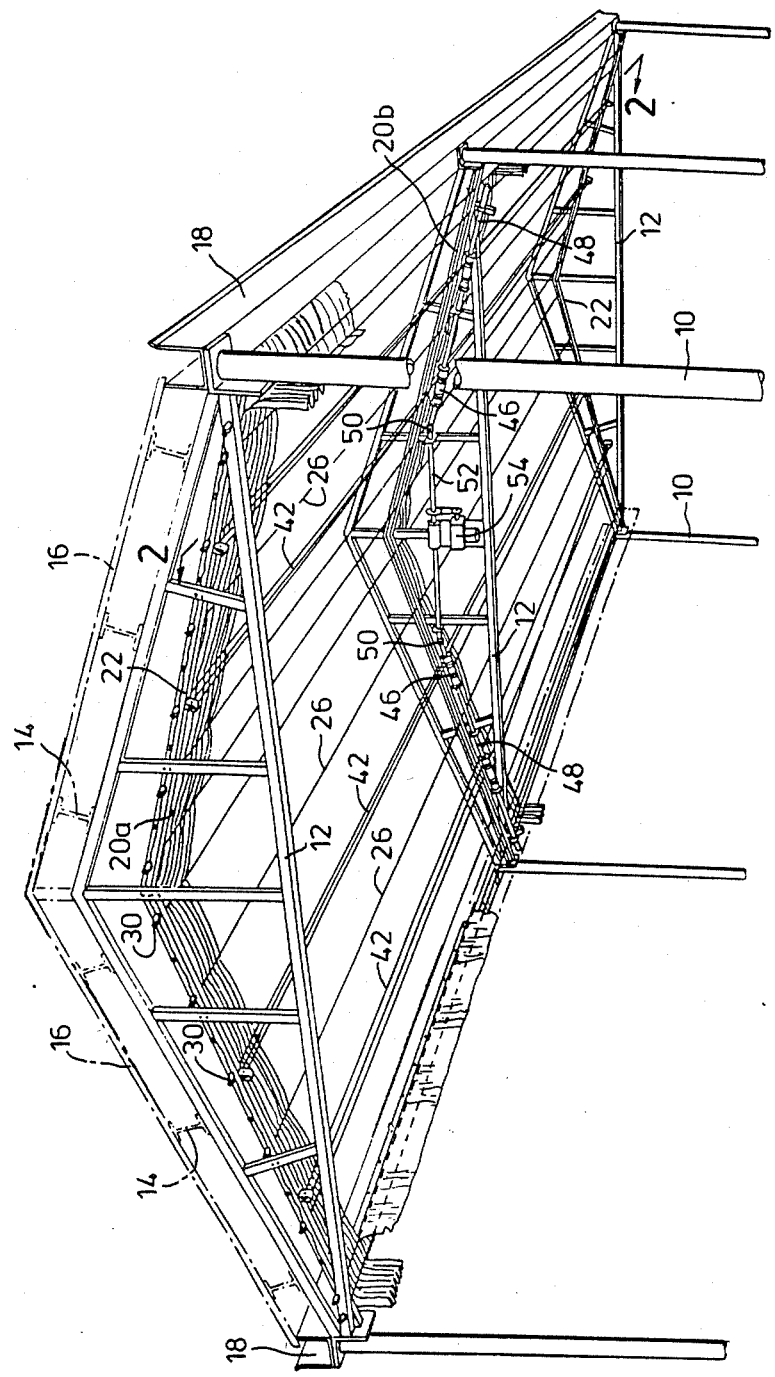
FIG. 1 is a perspective view from below of a complete curtain system installed in a greenhouse.

The main frame of the greenhouse is illustrated in this particular embodiment as comprising three pairs of vertical posts 10, each adjacent pair of which support between them a respective transverse roof truss 12, the trusses in turn support rafters 14 and the window frames 16. The posts also support longitudinal gutters 18. It will be understood that this particular structure is shown only to permit a full description of the invention and its manner of implementation, and the invention is applicable generally to any type of greenhouse structure and is not limited in any way to this specific embodiment thereof. Side curtains (if provided) and their support and operating mechanism are not shown.

Moreover, in the arrangement of moving curtains described and illustrated by the specific embodiment the curtains are gathered close to one truss and move truss-to-truss to open and close. It is also common to mount the curtains to move gutter-to-gutter but this cannot be used with the post-supported main structure illustrated. In another common arrangement the curtains are gathered when closed at the ridge and they move ridge-to-gutter. Each of these configurations has respective advantages and disadvantages which will dictate the selection for a particular greenhouse structure, the sealing member of the invention being usable with all of them.

Figure 2:
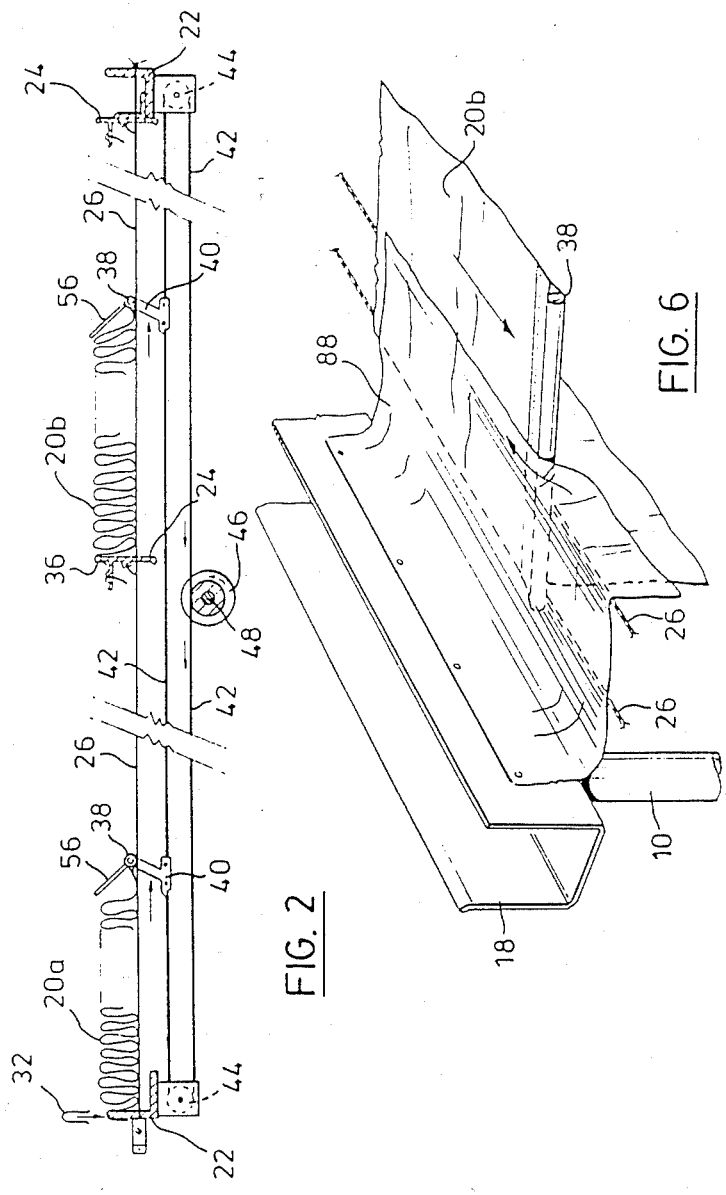
FIG. 2 is a diagrammatic side section taken on the line 2—2 of FIG. 1 to show the supporting and moving arrangements for a typical curtain system in which the curtain rests and moves on supporting wires.
Figure 4:
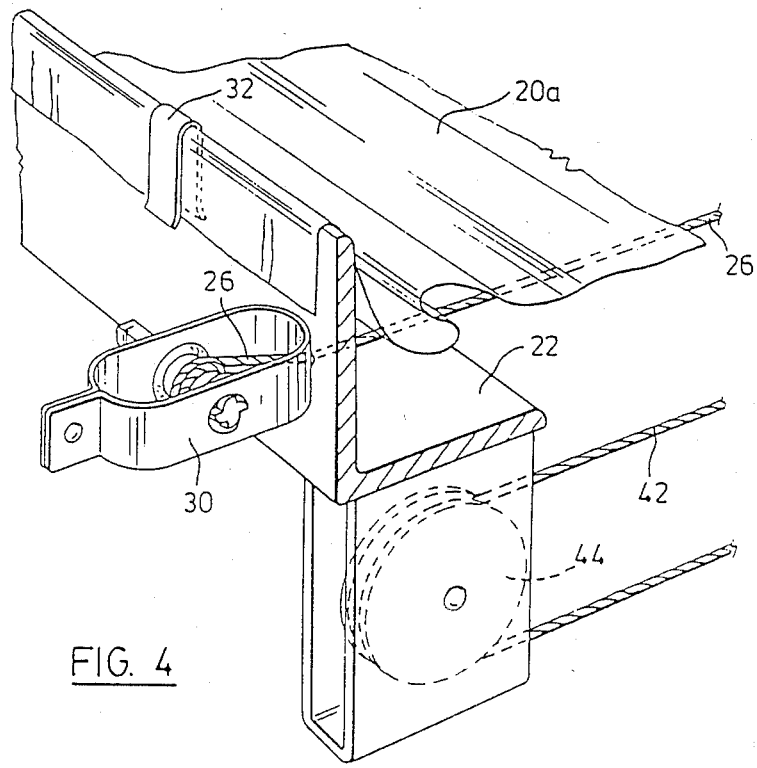
FIG. 4 is a perspective view similar to FIG. 3 showing the anchoring of the curtain fixed end and the tensioning of the support wires on which it moves.

Referring also to FIG. 2, in this particular embodiment the structure is provided with two sets of curtains 20a and 20b, both of which travel in the same direction to open and close. The two end-most roof trusses 12 have respective standard L-section members 22 mounted thereon facing one another, while the middle truss has a sealing member 24 of the invention mounted thereon parallel to the truss, as does the further L-section member 22; the members 24 will be described in detail below. Each curtain rests upon and is supported in its closing and opening movements by a plurality of tensioned transversely spaced wires 26, fourteen in this embodiment, the two wires which are closest to the gutters 18 being relatively closely spaced, as can be seen in FIGS. 1 and 6. Each wire is fastened at one end to one of the L-section members 22, passes through apertures 28 provided in the sealing members 24, and is fastened at its other end to a respective tensioning device 30, seen most clearly in FIG. 4, the operation of which will be apparent from the figure and forms no part of this invention, so that it need not be specifically described.

The permanently fixed end of the curtain 20a is folded over the longitudinal edge of the vertical leg of the respective member 22 (FIG. 4) and held by sheet metal spring clips 32, while the corresponding end of the other curtain 20b is folded over a longitudinal edge constituting bead 34 of the central sealing member 24 and is fastened thereto by spring wire clips 36. The moving end of each blind is wrapped around a rigid supporting tube 38 which is embraced at respective transversely-spaced locations by the ends of the arms of four transversely spaced travellers 40 by which the tube and curtain end are moved. Each traveller is clamped securely to an endless movable drive wire 42, which passes around end pulleys 44 mounted on each L-section member 22 and is wrapped for several turns around a respective drive sheave 46 rotatably mounted on the central truss 12. Each sheave 46 is mounted on a respective side drive shaft 48 which is connected by a universal joint 50 to a central drive shaft 52 to be driven thereby; the central shaft is in turn driven by a reversible controllable electric drive motor unit 54, further specific details of which are not required. Each traveller is provided with a rearwardly-upwardly-extending finger 56 that engages the respective curtain as the traveller moves to open the curtain and ensures that as the curtain moves toward its open position it is gathered and folded neatly as tightly as possible to minimise its blocking of the incident daylight.

Figure 3:
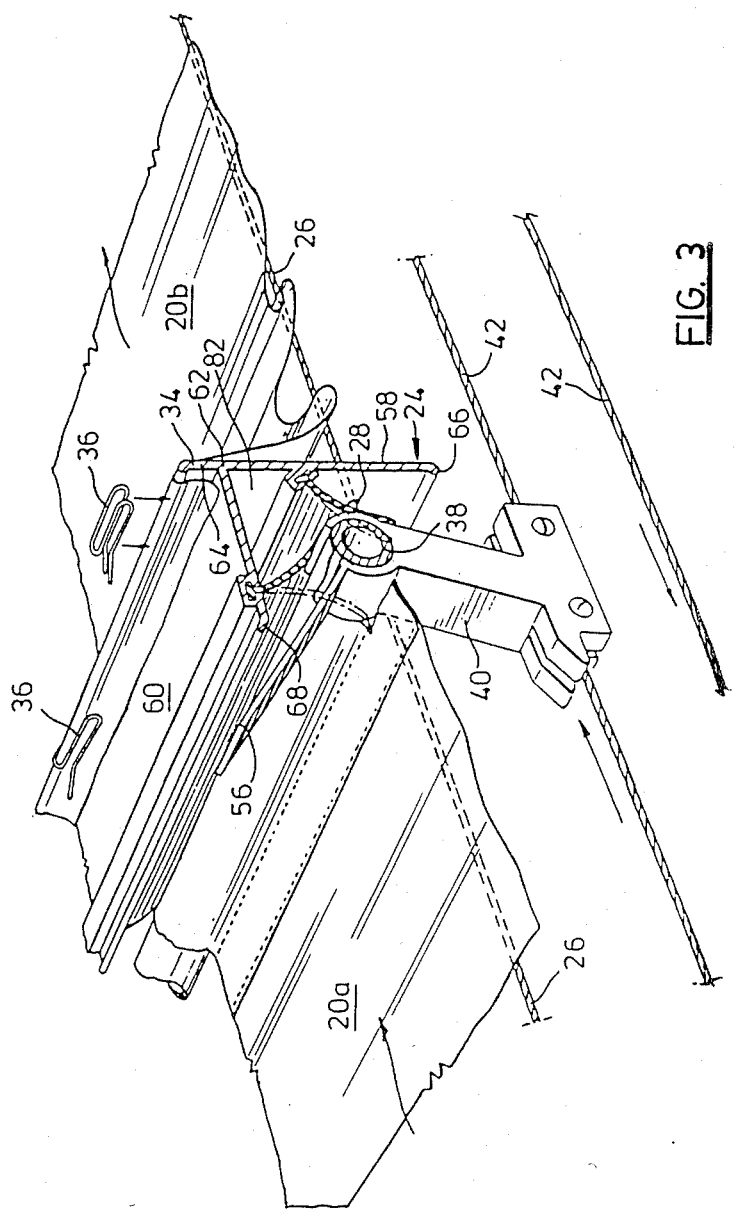
FIG. 3 is a perspective view to an enlarged scale, from one side, showing a movable curtain edge of a system as in FIG. 2 in closed position against a sealing component of the invention, the curtain edge therefore engaging the sealing component from below.
Figure 5:
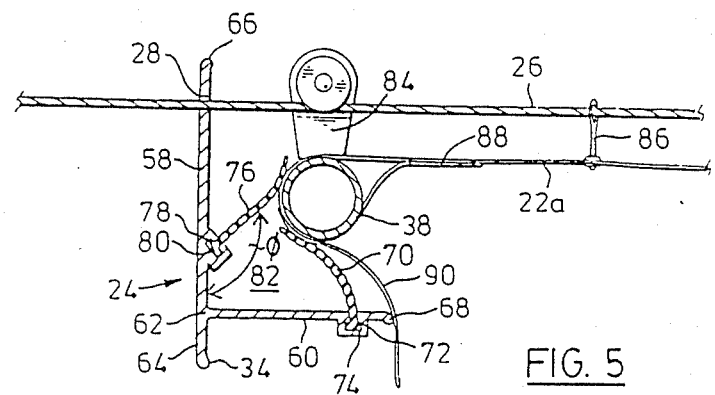
FIG. 5 is a side elevation, also showing a movable curtain edge in closed position against a sealing component of the invention, the curtain being suspended from support wires for its closing and opening movement therefore and engaging the sealing component from above.

Referring now particularly to FIGS. 3 and 5, the sealing member 24 of the invention is of L-shaped configuration having a first leg 58, which extends perpendicular to the direction of movement of the curtain leading edge and a second leg 60 which extends parallel to the direction of curtain movement, the two legs meeting at right angles to one another at a junction 62. The first leg extends somewhat beyond the second leg so that, as described above, it provides an extension 64 ending in the longitudinal bead 34 over which the adjacent fixed end of the curtain can be folded and secured thereto by spring clips, or some equivalent easily applied and removed fastening means. The sealing member is conveniently and simply made by extrusion from aluminium, or an alloy thereof, and each of the bead 34 and the ends 66 and 68 respectively of the two legs are enlarged and smoothly rounded to facilitate the application of spring clip fastening means over these ends, when required. The element is thus able to replace more complicated structures that have been employed hitherto using stretched wires and separate brackets fastened to the greenhouse structure. Such an integral self-supporting element is simpler and faster to install reducing the cost of installation.

The second leg 60 has protruding therefrom a first resilient seal element 70 which extends the full length of the sealing member. This first element protrudes perpendicularly from the leg 60, so that when uncontacted by the movable leading edge of the curtain it is approximately parallel to the first leg 58, or may even protrude a little away from that leg. The seal element is simply and effectively secured to the leg 60 by engagement of an enlarged bead 72 thereof at one edge in a slot 74 formed by the extrusion operation in a locally thickened portion of the leg, the slot having a mouth that is narrower than the remainder of the slot so that the bead is positively retained therein. Such a slot structure also has the effect of rendering the respective leg more rigid. When engaged by the curtain leading edge in its closed position the seal element is bent out of its vertical conformation, as shown in FIGS. 3 and 5, so that the seal element is positively pressed by the resilience of the material from which it is made against the edge and can positively seal against the leakage of air. Such a seal is in most cases sufficiently effective for sealing against heat loss, and is sufficiently effective for light sealing when the curtain is used to provide shade against excessive daylight.

Such a single seal is not always sufficient for the degree of heat sealing required and/or for complete exclusion of light and accordingly the first leg is provided with a second resilient seal element 76 having an enlarged head 78 that is engaged in a narrow-mouth slot 80 formed by the extrusion operation in a locally thickened portion of the first leg 58. In this embodiment this second seal element has its junction with the first leg at a distance from the leg junction 62 that is less than the length of the first seal element, and it protrudes at an obtuse angle $\theta$ of about 135° on the side nearer the second leg, so that the distance between it and the second leg increases progressively along its width away from the first leg. The engagement of the curtain leading edge with this second seal element can only occur after the first seal element has been bent a substantial distance toward the first leg, whereupon the second seal element is also bent towards the first leg and therefore positively engages the leading edge under the urge of the resilience of the material from which the seal element is made. The two seal elements thus form between themselves and the element legs a completely closed space 82 interposed between the interior of the greenhouse and the space between the curtain and the greenhouse roof, so that particularly effective sealing is obtained both against heat loss and light transmission. The angle of inclination of the second seal element is not critical and can vary substantially from that of the specific embodiment illustrated. The element of the invention is illustrated as an intermediate member but can of course also function as an end member at which the support wires terminate.

In the construction of FIG. 5 the leading edge stiffening rod 38 is suspended by wheeled carriers 84 from supporting wires 26, while the body of the curtain is suspended from the same wires by sliding fixed loop suspension members 86. Such an arrangement is preferred in some installations if feasible, since the hanging curtain will fold neatly and the suspension members 86 can readily be replaced as they become worn. It will be seen that this inversion of the sealing member does not in any way affect its capacity to provide a tight seal between itself and the curtain leading edge and its function is the same as with the first-described embodiment. The figure also illustrates two different ways of securing the curtain edge to the support pipe 38, namely by wrapping it around the pipe and fastening it to itself at 88, or alternatively by clipping it to the pipe by clips (not shown) so that the edge 90 hangs loosely. The latter arrangement permits the hanging edge 90 to provide a further heat seal against the element bead 68.

FIG. 6 shows the manner in which an effective heat seal can be obtained between the longitudinal edges of the curtains and the adjacent greenhouse structure walls. A narrow elongated strip 88 of the curtain material is fastened to the adjacent wall along its full length and is sufficiently wide that it will not only overlay the adjacent curtain edge, but will also overlay the adjacent closely-spacedd pair of supporting wires 26 and will even hang down from the inner wire 26. As the curtain 20b moves forward it slides between the wires and the sealing strip 88 and lifts the hanging edge which then lies smoothly on top of the curtain.

For convenience in terminology the term "curtain" only is employed in the claims, but it will be understood that the term also includes light-excluding curtains which are more usually referred to in the industry as "blinds".

We claim:

1. A greenhouse, movable curtain system comprising:
a greenhouse frame;
at least two greenhouse curtains, each curtain having a straight leading edge and being of the type that is opened and closed by longitudinal movement of the said straight leading edge transverse to its length, the other curtain edge being fixed against movement;
curtain support means mounted on the greenhouse frame and mounting the curtains thereon for their respective longitudinal movements;
a self-supporting sealing member mounted on the greenhouse frame, disposed between and cooperating with the movable curtain straight leading edge of one of two immediately adjacent curtains, and the fixed edge of the other of the said two immediately adjacent curtains the curtain leading edge in the closed position of the curtain engaging the said sealing member, the sealing member comprising:
an elongated metal body of at least approximately L-shaped transverse cross-section having a first leg which in operation extends transverse to the direction of movement of the curtain, and having a second leg which in operation extends generally parallel to the direction of movement of the curtain;
the first leg extending beyond its junction with the second leg to provide a bead over which the adjacent fixed edge of the respective curtain can be folded and secured thereto; and
a first elongated flexible seal element extending lengthwise of the sealing member and protruding from the second leg spaced from the first leg whereby upon engagement by the curtain leading edge it is deflected by the engagement towards the first leg, so as to be held in sealing engagement with the curtain leading edge by the resilience of the material of the seal element; and
means for securing the said adjacent curtain fixed edge over the said bead.

2. A greenhouse movable curtain system as claimed in claim 1, wherein the free ends of the first and second legs of the sealing member also constitute beads providing smooth rounded surfaces for engagement with curtain material and over which curtain material can be folded and secured thereto.

3. A greenhouse movable curtain system as claimed in claim 2, wherein the elongated sealing member body is of extruded material and has formed in the second leg at a location spaced from its free edge and from its junction with the first leg in a locally-thickened portion of the leg a longitudinally-extending slot with a mouth narrower than the width of the slot, and wherein the first seal element has at one longitudinal edge thereof an enlarged bead for retaining engagement of the seal element in the slot.

4. A greenhouse movable curtain system as claimed in claim 1, wherein the elongated sealing member body is of extruded material and has formed in the second leg at a location spaced from its free edge and from its junction with the first leg in a locally-thickened portion of the leg a longitudinally-extending slot with a mouth narrower than the width of the slot, and wherein the first seal element has at one longitudinal edge thereof an enlarged bead for retaining engagement of the seal element in the slot.

5. A greenhouse moveable curtain system as claimed in claim 1, wherein the first leg is provided with apertures through which pass support wires on which the curtain moves in its opening and closing movement.

6. A self-supporting sealing member for a movable curtain system for greenhouses of the kind in which a curtain having a straight leading edge is opened and closed by longitudinal movement of the said straight leading edge transverse to its length, the curtain leading edge in the closed position of the curtain engaging the said sealing member, the sealing member comprising:

an elongated metal body of at least approximately L-shaped transverse cross-section having a first leg which in operation extends transverse to the direction of movement of the curtain, and having a second leg which in operation extends generally parallel to the direction of movement of the curtain;

the first leg extending beyond its junction with the second leg to provide a bead over which the adjacent fixed edge of a curtain can be folded and secured thereto; and a first elongated flexible seal element extending lengthwise of the sealing member and protruding from the second leg spaced from the first leg whereby upon engagement by the curtain leading edge it is deflected by the engagement towards the first leg, so as to be held in sealing engagement with the curtain leading edge by the resilience of the material of the seal element, and;

a second elongated flexible seal element also extending lengthwise of the sealing member and protruding from the first leg at a location spaced from the second leg free edge and from its junction with the second leg, whereby upon engagement of the curtain leading edge with the first seal element and deflection of the latter towards the first leg the curtain leading edge engages the second seal element for deflection thereof toward the first leg, so that the second seal element also is held in sealing engagement with the curtain leading edge by the resilience of its material.

7. A self-supporting sealing member as claimed in claim 6, wherein the first seal element when undeflected by the curtain leading edge protrudes perpendicularly from the second leg parallel to the first leg.

8. A self-supporting sealing member as claimed in claim 6, wherein the elongated sealing member body is of extruded material and has formed in the first leg at a location spaced from its free edge and from its junction with the first leg and in a locally-thickened portion of the leg a longitudinally-extending slot with a mouth narrower than the width of the slot, and wherein the second seal element has at one longitudinal edge thereof an enlarged bead for retaining engagement of the seal element in the slot.

9. A self-supporting sealing member as claimed in claim 6, wherein the first leg is provided with apertures through which pass support wires on which the curtain moves in its opening and closing movement.

10. A self-supporting sealing member as claimed in claim 6, wherein the elongated sealing member body is of extruded material and has formed in the second leg at a location spaced from its free edge and from its junction with the first leg in a locally-thickened portion of the leg a longitudinally-extending slot with a mouth narrower than the width of the slot, and wherein the first seal element has at one longitudinal edge thereof an enlarged bead for retaining engagement, of the seal element in the slot.

11. A self-supporting sealing member for a movable curtain system for greenhouses of the kind in which a curtain having a straight leading edge is opened and closed by longitudinal movement of the said straight leading edge transverse to its length, the curtain leading edge in the closed position of the curtain engaging the said sealing member, the sealing member comprising:

an elongated metal body of at least approximately L-shaped transverse cross-section having a first leg which in operation extends transverse to the direction of movement of the curtain, and having a second leg which in operation extends generally parallel to the direction of movement of the curtain, a first elongated flexible seal element extending lengthwise of the sealing member and protruding from the second leg spaced from the first leg whereby upon engagement by the curtain leading edge it is deflected by the engagement towards the first leg, so as to be held in sealing engagement with the curtain leading edge by the resilience of the material of the seal element; and a second elongated flexible seal element also extending lengthwise of the sealing member and protruding from the first leg at a location spaced from the second leg free edge and from its junction with the second leg whereby upon engagement of the curtain leading edge with the first seal element and deflection of the latter towards the first leg the curtain leading edge engages the second seal element for deflection thereof toward the first leg, so that the second seal element also is held in sealing engagement with the curtain leading edge by the resilience of its material; wherein the distance between the junction of the two legs and the junction of the second seal element with the first leg is less than the length of the first seal element, and the second seal element protrudes at an obtuse angle on the side nearer the second leg so that the distance between it and the second leg increases progressively away from its junction with the first leg.

12. A self-supporting sealing member as claimed in claim 11 wherein the first seal element when undeflected by the curtain leading edge protrudes perpendicularly from the second leg parallel to the first leg.

13. A self-supporting sealing member as claimed in claim 11, wherein the first leg is provided with apertures through which pass support wires on which the curtain moves in its opening and closing movement.

14. A self-supporting sealing member for a movable curtain system of the kind in which a curtain with a straight leading edge is opened and closed by longitudinal movement of the said straight leading edge transverse to its length, the curtain leading edge in the closed position of the curtain engaging the said sealing member, the sealing member comprising:

an extruded elongated metal body of at least approximately L-shaped transverse cross-section having a first leg which in operation extends transverse to the direction of movement of the curtain, and having a second leg which in operation extends generally parallel to the direction of movement of the curtain;

the body having formed in the two legs respective longitudinally-extending slots, each with a mouth narrower than the width of the slot, and each disposed at a locally-thickened location spaced from the free edge of the respective leg and the junction between the two legs; and a first elongated flexible seal element extending lengthwise of the sealing member and protruding from the respective slot in the second leg spaced from the first leg, the seal element having at one longitudinal edge thereof an enlarged bead engaged in the slot for retaining engagement in the slot, whereby upon engagement by the curtain leading edge it is deflected by the engagement towards the first leg, so as to be held in sealing engagement with the curtain leading edge by the resilience of the material of the seal element;

and also comprising a second elongated flexible seal element also extending lengthwise of the sealing member and protruding from the respective slot in the first leg spaced from the second leg, the second seal element having at one longitudinal edge thereof an enlarged bead engaged in the slot for retaining engagement in the slot, whereby upon engagement of the curtain leading edge with the first seal element and deflection of the latter towards the first leg the curtain leading edge engages the second seal element for deflection thereof toward the first leg, so that the second seal element also is held in sealing engagement with the curtain leading edge by the resilience of its material.

* * * * *